US010507525B2

(12) United States Patent
Casper et al.

(10) Patent No.: US 10,507,525 B2
(45) Date of Patent: Dec. 17, 2019

(54) METHOD AND DEVICE FOR MANUFACTURING AT LEAST A PORTION OF A COMPONENT

(71) Applicant: MTU Aero Engines AG, Munich (DE)

(72) Inventors: Johannes Casper, Munich (DE); Georg Schlick, Munich (DE); Alexander Ladewig, Bad Wiessee (DE)

(73) Assignee: MTU Aero Engines AG, Munich (DE)

( * ) Notice: Subject to any disclaimer, the term of this patent is extended or adjusted under 35 U.S.C. 154(b) by 226 days.

(21) Appl. No.: 15/486,853

(22) Filed: Apr. 13, 2017

(65) Prior Publication Data

US 2017/0297101 A1 Oct. 19, 2017

(30) Foreign Application Priority Data

Apr. 19, 2016 (DE) ........................ 10 2016 206 558

(51) Int. Cl.
*B22F 3/105* (2006.01)
*B22F 3/10* (2006.01)
(Continued)

(52) U.S. Cl.
CPC .......... *B22F 3/1017* (2013.01); *B22F 3/1055* (2013.01); *B22F 5/009* (2013.01); *B23K 13/01* (2013.01); *B23K 26/342* (2015.10); *B23K 26/346* (2015.10); *B33Y 10/00* (2014.12); *B33Y 30/00* (2014.12); *B22F 2003/1056* (2013.01);
(Continued)

(58) Field of Classification Search
CPC ........... B23K 26/342; B22F 2003/1053; B22F 2202/07
See application file for complete search history.

(56) References Cited

U.S. PATENT DOCUMENTS 6,098,871 A 8/2000 Cairo et al.
6,193,141 B1 2/2001 Burke et al.
(Continued)

FOREIGN PATENT DOCUMENTS

DE 10 2009 051 479 A1 5/2011
DE 10 2012 206 122 A1 10/2013
(Continued)

*Primary Examiner* — Jacob T Minskey
*Assistant Examiner* — Cedrick S Williams
(74) *Attorney, Agent, or Firm* — Davidson, Davidson & Kappel, LLC

(57) ABSTRACT

A method for manufacturing at least a metallic portion of a component: a) depositing metallic material layer by layer onto at least one building platform; b) locally fusing and/or sintering the material layer by layer by supplying energy by at least one high-energy beam in the region of a buildup and joining zone to form at least a portion of at least one component layer of the component portion and/or of the component; c) lowering the building platform layer by layer by a predefined layer thickness; and d) repeating the steps a) through c) until completion of the component portion and/or of the component. Before, during and/or after process step b), at least one further portion of the component layer is formed by locally fusing and/or sintering the material by inductive heating at a temperature or in a temperature range above the solidus temperature of the metallic material used. A system for manufacturing at least a portion of a component is also provided.

22 Claims, 2 Drawing Sheets

(51) Int. Cl.
  *B33Y 10/00* (2015.01)
  *B33Y 30/00* (2015.01)
  *B23K 26/342* (2014.01)
  *B23K 26/346* (2014.01)
  *B23K 13/01* (2006.01)
  *B22F 5/00* (2006.01)

(52) U.S. Cl.
  CPC ......... *B22F 2999/00* (2013.01); *Y02P 10/295* (2015.11)

(56) References Cited

U.S. PATENT DOCUMENTS

| | | | |
|---|---|---|---|
| 7,805,824 | B2 | 10/2010 | El-Wardany et al. |
| 7,892,370 | B2 | 2/2011 | Ott et al. |
| 8,610,027 | B2 | 12/2013 | Hoevel et al. |
| 2003/0160045 | A1 | 8/2003 | Eberhardt et al. |
| 2009/0314393 | A1 | 12/2009 | Kelly et al. |
| 2010/0173094 | A1 | 7/2010 | Manier et al. |
| 2012/0213659 | A1 | 8/2012 | Bayer et al. |
| 2014/0239553 | A1 | 8/2014 | Bamberg et al. |
| 2015/0064050 | A1 | 3/2015 | Retze et al. |
| 2015/0129583 | A1 | 5/2015 | Richter et al. |
| 2015/0246481 | A1 | 9/2015 | Schlick et al. |
| 2015/0306820 | A1 | 10/2015 | Colin |
| 2016/0368052 | A1 * | 12/2016 | Jakimov ............... B22F 3/1055 |

FOREIGN PATENT DOCUMENTS

| | | | |
|---|---|---|---|
| DE | 102014203711 | | 9/2015 |
| DE | 102015214994 | | 2/2017 |
| EP | 2 359 964 A1 | | 8/2011 |
| EP | 2 572 815 B1 | | 3/2013 |
| WO | WO-2014202413 A2 * | 12/2014 | ............ B22F 3/1055 |
| WO | WO2015/155745 | | 10/2015 |

\* cited by examiner

METHOD AND DEVICE FOR MANUFACTURING AT LEAST A PORTION OF A COMPONENT

This claims the benefit of German Patent Application DE102016206558.0, filed Apr. 19, 2016 and hereby incorporated by reference herein.

The present invention relates to a method and a device for manufacturing at least a portion of a component, in particular a component of a turbomachine.

BACKGROUND

A large number of methods and devices for manufacturing components are known. The known methods include, in particular, additive manufacturing methods (referred to as rapid manufacturing and rapid prototyping), in which the component is built up layer by layer by means of powder bed based additive manufacturing processes. Primarily metallic components can be produced, for example, by laser or electron beam melting or sintering processes. In such processes, initially, at least one component material in powder form is deposited layer by layer onto a component platform in the region of a buildup and joining zone of the device. Subsequently, the component material is locally fused and/or sintered layer by layer by supplying energy to the component material in the region of the buildup and joining zone by means of at least one high-energy beam, for example an electron or laser beam. In the process, the high-energy beam is controlled as a function of layer information of the respective component layer to be produced. After fusion and/or sintering, the component platform is lowered layer by layer by a predefined layer thickness. Thereafter, the aforementioned steps are repeated until final completion of the component.

Also known in the prior art are, in particular, additive manufacturing methods for the manufacture of components of a turbomachine (e.g., components of an aircraft engine or a gas turbine), such as the method described in DE 10 2009 051 479 A1 and a corresponding device for manufacturing a component of a turbomachine. In this method, such a component is manufactured by layer-by-layer deposition of at least one component material in powder form onto a component platform in a region of a buildup and joining zone and local layer-by-layer melting or sintering of the component material by energy supplied in the region of the buildup and joining zone. The energy is supplied via laser beams of, for example, $CO_2$ lasers, Nd:YAG lasers, Yb fiber lasers, as well as diode lasers, and/or by electron beams. In the method described in DE 10 2009 051 479 A1, moreover, the buildup and joining zone is heated to a temperature slightly below the melting point of the component material using a zone furnace in order to obtain or maintain a directionally solidified or monocrystalline crystal structure.

DE 10 2012 206 122 A1 describes a device for additive manufacturing of components by laser powder cladding and/or selective irradiation of a powder bed, the device including at least one induction coil which is movable relative to one or more powder bed chambers. The induction coils are movable linearly along separately formed rail devices. By locally inductively preheating the powder layers to be fused during the additive build-up of the component, it is possible to reliably prevent hot cracking during the manufacture of the component, in particular when processing high-temperature alloys. Inductive heating of the component to be manufactured is also described in EP 2 359 964 A1 in connection with the additive manufacture of a component by selective laser sintering. An additive manufacturing method is also described in EP 2 572 815 B1, which also uses inductive excitation to heat the component during the manufacture thereof. In accordance with EP 2 572 815 B1, undesired melting or sintering processes should be prevented from occurring in the powder bed 4.

While these known methods enable processing of metallic materials which are susceptible to cracking, they have the disadvantage of hindering selective irradiation of a contour of the component to be manufactured. The reason for this is, in particular, that the induction coils at least partially cover the powder layers, in particular in the contour regions, during irradiation thereof. Therefore, the buildup and joining zone of the powder bed is partially inaccessible to, or difficult to access for, an energy beam, in particular a laser beam. Also, the limited coil velocity, which is due to the limitations of linear motion technology, makes it technically very complex to coordinate the movements of the induction coil and laser beam during the additive build-up of a component.

SUMMARY OF THE INVENTION

It is an object of the object of the present invention to provide a method for manufacturing at least a portion of a component which achieves improved component quality, in particular improved surface quality, in additively manufactured metallic component portions or metallic components without adding much to the complexity of the apparatus. Another object of the present invention is to provide a generic device which achieves improved component quality, in particular improved surface quality, in additively manufactured metallic component portions or metallic components without adding much to the complexity of the apparatus.

Advantageous embodiments of each inventive aspect are considered to be advantageous embodiments of the respective other inventive aspects and vice versa.

A first aspect of the present invention relates to a method for manufacturing at least a metallic portion of a component, in particular a component of a turbomachine, the method including at least the following steps: a) depositing at least one metallic material layer by layer onto at least one building platform; b) locally fusing and/or sintering the material layer by layer by supplying energy by means of at least one high-energy beam in the region of a buildup and joining zone to form at least a portion of at least one component layer of the component portion and/or of the component; c) lowering the building platform layer by layer by a predefined layer thickness; and d) repeating the steps a) through c) until completion of the component portion and/or of the component. In accordance with the present invention, before, during and/or after local layer-by-layer fusion and/or sintering according to process step b), at least one further portion of the component layer is formed by locally fusing and/or sintering the material by inductive heating at a temperature or in a temperature range above the solidus temperature of the metallic material used. In accordance with the present invention, at the temperature or temperature range mentioned, which may in particular also be above the melting point of the metallic material, the metallic material is caused to undergo incipient fusion and/or is fused and/or sintered by inductive heating. The heating in accordance with the present invention significantly improves the surface quality of the component portion or component produced. In particular, it is possible to prevent the formation of cracks or crack-like structures during the manufacture of the component portion and/or component. Advantageously, for purposes of inductive heating, an already existing induction device typically used for preheating the powder material prior to fusion and/or sintering thereof can also be used for the aforementioned inventive fusion and/or sintering of at least a portion of the material layer(s) to form corresponding component layer(s) of the additively manufactured component portion and/or component. Therefore, no additional apparatus is needed to implement the method of the present invention. In particular, regions of a layer or bed of metallic powder material which are typically at least temporarily inaccessible or difficult to access for irradiation by an energy beam can be reliably locally fused and/or sintered by means of the inductive thermal treatment or heating. The temperature at which the above-mentioned preheating takes place is below the solidus temperature of the material used. In this connection, the preheating of the layer of powder material and the fusion and/or sintering thereof are essentially independent process steps. However, it is also conceivable to combine these process steps.

Furthermore, the formation of the further portion of the component layer by locally fusing and/or sintering the material by inductive heating may or may not occur in all material layers. The heating penetration depth may be varied by controlling the frequency. Through suitable adjustment to the predetermined component geometry, it is possible to optimize the process sequence for building up the individual layers of the component with respect to the fusion and/or sintering by means of the high-energy beam and the inductive heating.

The method according to the present invention may in particular be used for any metallic material. For example, the metallic material may be composed of a nickel-based alloy, a nickel superalloy, a medium- or high-alloy steel, a cobalt-based alloy, an iron-based alloy, a precipitation-hardened alloy based on aluminum, a copper, molybdenum or platinum alloy, or a mixture thereof. Other metallic materials may also be envisaged. Moreover, the metallic material may have a ceramic material or carbon fibers added thereto.

In advantageous embodiments of the method according to the present invention, the additive manufacturing method may be a selective laser melting or sintering process or an electron beam melting or sintering process or a combination of these processes. Other additive manufacturing methods may also be envisaged.

In advantageous embodiments of the method according to the present invention, the inductive heating is used to fuse and/or sinter a contour region at least within the at least one material layer. By controlling the frequency of the inductive heating, it is possible, for example, to vary the heating penetration depth into the material and/or component layer before, during or after the additive manufacture by means of the high-energy beam. For example, by using higher induction power in the contour or edge region of the component, it is possible to finish this contour region without using the laser. In this manner, in particular, a reduction in surface roughness is achieved. Furthermore, during the additive manufacture of the component portion and/or component according to process step b), the material, prior to being locally fused and/or sintered layer by layer by at least one high-energy beam, may at least partially be heated by inductively heating it to a temperature below the solidus temperature of the material. This preheating below the solidus temperature of the material used makes it possible to reduce cracking during the additive manufacture of the component portion and/or component.

The aforementioned different options for inductive thermal treatment or heating may be implemented using one or multiple induction devices. These are typically controllable in open- and closed-loop fashion.

A second aspect of the present invention relates to a device for manufacturing at least a portion of a component, in particular a component of a turbomachine, the device including at least one powder feeder for depositing at least one layer of metallic powder onto a buildup and joining zone of a building platform and at least one radiation source for generating at least one high-energy beam, by which the at least one powder layer can be locally fused and/or sintered in the region of the buildup and joining zone to form at least a portion of a component layer. The device further includes at least one induction device which is at least adapted to form a further portion of the component layer by locally fusing and/or sintering, layer by layer, the material of the powder layer by inductive heating at a temperature or in a temperature range above the solidus temperature of the metallic material used. Advantageously, the inventive device allows an already existing induction device typically used for preheating the powder material prior to fusion and/or sintering thereof to be used also for the above-mentioned inventive formation of the further portion of the component layer of the additively manufactured component portion and/or component. Therefore, no additional apparatus is needed. In addition, regions of a layer or bed of metallic powder material which are typically at least temporarily inaccessible or difficult to access for irradiation by an energy beam can be reliably locally fused and/or sintered by means of the inductive thermal treatment.

The temperature at which the above-mentioned preheating takes place is below the solidus temperature of the metallic material used. In this connection, the preheating of the layer of powder material and the fusion and/or sintering thereof are essentially independent process steps. However, it is also conceivable to combine these process steps. The high-energy beam may be a laser or electron beam.

In other advantageous embodiments of the device according to the present invention, the device takes the form of a selective laser melting apparatus and/or an electron beam melting apparatus.

In further advantageous embodiments of the device according to the present invention, the induction device includes at least one induction coil. Furthermore, at least two induction coils may form an intersection region (cross coil concept). Due to the superposition of the electromagnetic fields, the highest temperatures are reached in the aforementioned intersection region. Moreover, the induction device may be designed to be controllable such that different temperatures or temperature ranges achievable by inductive heating can be set and controlled before, during and/or after the additive manufacture of the component portion and/or component, in particular by controlling the frequency range. For example, at least one temperature or a temperature range may be below the solidus temperature of the material during the additive manufacture of the component portion and/or component.

Furthermore, the further portion of the at least one component layer, which portion is produced by inductive heating, may be a contour region of the component portion and/or component. Thus, depending on the requirements to be met by the component to be produced, the device according to the present invention can advantageously be embodied in many ways. Furthermore, it is possible to perform different inductive heating operations using a single induction device. This significantly minimizes the complexity of the apparatus. However, it is, in principle, also possible to use a plurality of induction devices. For example, at least one further, movable or non-movable induction coil may be designed to cause the contour region of the component portion and/or component within the powder layer to be fused and/or sintered by inductive heating. This can be accomplished, for example, by setting the frequency range of the induction coil in such a manner that the heating is primarily restricted to the contour region. This makes it possible, in particular, to significantly reduce the roughness of the component in the contour region, since there is no need to subject these critical edge regions to multiple laser processing operations or to irradiation with high laser power and an irregular melting process associated therewith.

The induction device typically has an open- and/or closed-loop controller configured to control the inductive heating power and/or the position of the induction device in open- and/or closed-loop fashion. Moreover, the device may include a temperature sensing device, the open- and/or closed-loop controller controlling the position and/or the power of the induction device based on the measurements of the temperature sensing device. It is also conceivable to control the power of the induction device in closed- or open-loop fashion as a function of the position of the induction device.

Other features and advantages thereof will become apparent from the description of the first inventive aspect. Advantageous embodiments of the first inventive aspect are considered to be advantageous embodiments of the second inventive aspect and vice versa.

A third aspect of the present invention relates to a component for a turbomachine, in particular for an aircraft engine, which is obtainable and/or obtained by a method according to the first inventive aspect and/or by a device according to the second inventive aspect. A component manufactured in accordance with the present invention is of excellent quality, in particular surface quality. The materials that can be used for such components include, in particular, materials which are typically not used because of their susceptibility to cracking. This applies especially to components made of high-temperature resistant nickel-based alloys.

Other features and advantages thereof will become apparent from the description of the first and second inventive aspects. Advantageous embodiments of the first and inventive aspects are considered to be advantageous embodiments of the third inventive aspect and vice versa.

BRIEF DESCRIPTION OF THE DRAWINGS

Further features will become apparent from the claims and the exemplary embodiment. The features and feature combinations mentioned above in the description as well as the features and feature combinations mentioned below in the exemplary embodiment and/or shown in isolation are usable not only in the respectively specified combination, but also in other combinations or alone, without departing from the scope of the invention. Thus, embodiments of the invention that are not shown and explained explicitly in the exemplary embodiment, but proceed from and can be created by separate combinations of features from the stated embodiments, are also considered to have been included and disclosed herein. In addition, embodiments and combinations of features that therefore do not have all of the features of an originally formulated independent claim are also considered to have been disclosed herein. In the drawing.

DETAILED DESCRIPTION

Figure 1:
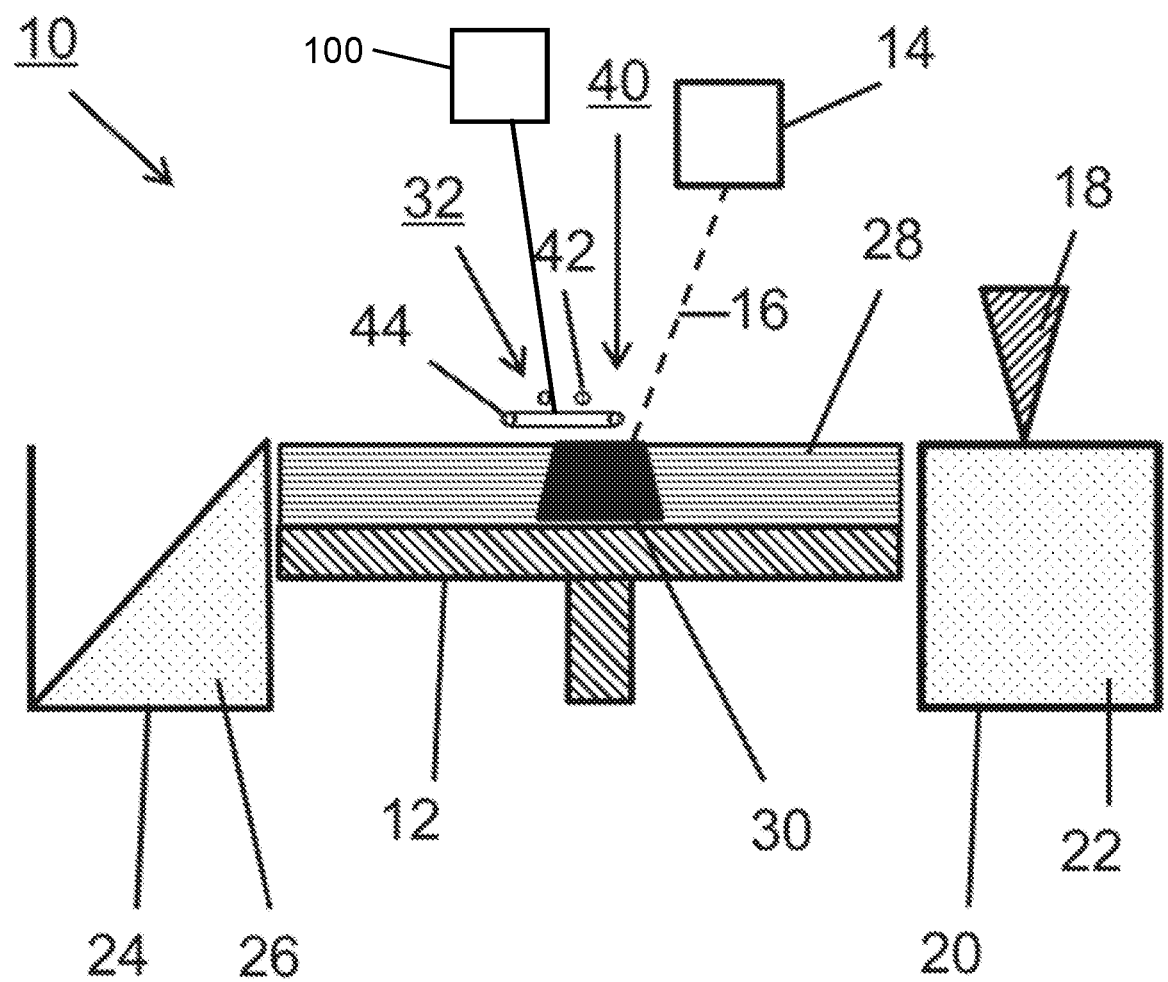
FIG. 1 is a schematic view of a device according to the present invention.

FIG. 1 schematically shows a device 10 for manufacturing a metallic component 30, in particular a component of a turbomachine. Device 10 includes a powder feeder 18 for depositing a metallic material 22 as a powder layer 28 onto a buildup and joining zone 40 of a building platform 12. Metallic material 22 is stored in a reservoir 20 and deposited layer by layer onto building platform 12 via powder feeder 18, which is configured, in particular, as a so-called coater. In the region of buildup and joining zone 40, powder layers 28 are locally fused and/or sintered layer by layer by a laser beam 16 emitted by a laser source 14 in order to form at least a portion of a component layer. A specified component geometry of component 30 is obtained through the control of laser beam 16. Any material not needed for building component 30 is conveyed by coater 18 into an overflow container 24. The material not needed is denoted by 26.

Device 10 further includes an induction device 32 including two induction coils 42, 44. The two induction coils 42, 44 form an intersection region and are configured according to the so-called cross coil concept. Induction device 32 is configured to be movable above powder layer 28 and building platform 12. Furthermore, induction device 32 is adapted to form a thermal treatment or heating of at least one further portion of the component layer by locally fusing and/or sintering material 22 by inductive heating at a temperature or in a temperature range above the solidus temperature of the metallic material 22 used. When high-temperature resistant nickel-based alloys, such as, for example, M247, are used as the material 22, the temperature range mentioned is above about 1250 to 1260° C. Induction device 32 is controlled in open- and closed-loop fashion by an open- and closed-loop controller 100. This concerns, on the one hand, the power of induction device 32 or of the individual induction coils 42, 44, respectively, and, on the other hand, their position above building platform 12.

Figure 2:
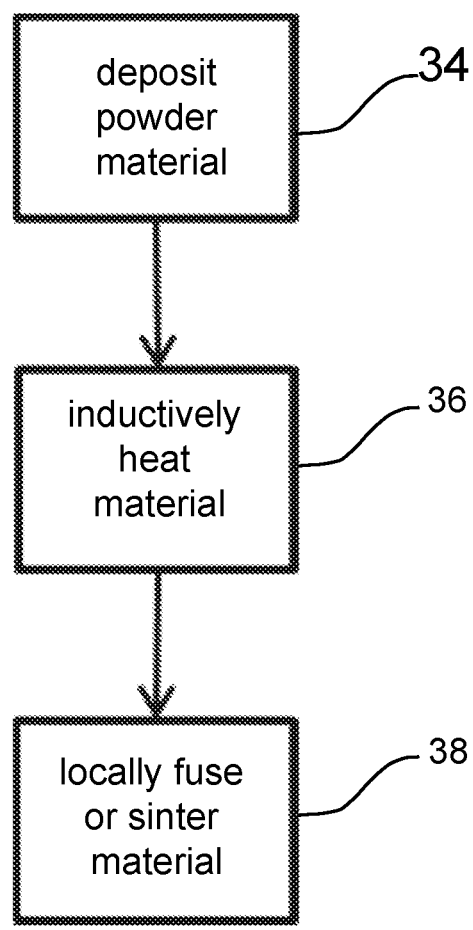
FIG. 2 is a flow chart for illustrating an exemplary embodiment of the method according to the present invention.

FIG. 2 shows a flow chart for illustrating an exemplary embodiment of the method according to the present invention. In a first process step 34, power material 22 is deposited layer by layer onto building platform 12. In a second process step 36, the material 22 in powder layer 28 is at least partially heated by inductive heating, namely before it is locally fused and/or sintered layer by layer by laser beam 16. The temperature of this preheating process is below the solidus temperature of material 22. In third process step 38, which may be performed subsequently or concurrently, powder layer 28 is locally fused and/or sintered in the region of the buildup and joining zone by laser beam 16 to form at least a portion of the component layer. The aforementioned process steps 34 through 38 are repeated until component 30 is completed. Before, during and/or after local layer-by-layer fusion and/or sintering according to process step 36, at least one further portion of the component layer is formed by locally fusing and/or sintering material 22 by inductive heating at a temperature or in a temperature range above the solidus temperature of the metallic material 22 used. In the exemplary embodiment shown, the induction device 32 used in process step 36 for inductive preheating of powder layer 28 is also used to form the further portion of the component layer.

LIST OF REFERENCE NUMERALS 10 device
12 building platform
14 laser source
16 laser beam
18 powder feeder
20 reservoir
22 material
24 overflow container
26 material
28 powder layers
30 component
32 induction device
34 deposit powder material
36 inductively heat material
38 locally fuse or sinter material
40 buildup and joining zone
42 induction coil
44 induction coil
100 controller

What is claimed is:

1. A method for manufacturing at least a portion of a component, the method comprising at least the following steps:
    a) depositing at least one metallic material layer by layer onto at least one building platform;
    b) locally fusing or sintering the material layer by layer by supplying energy by at least one high-energy beam in a region of a buildup and joining zone to form at least a portion of at least one component layer of the component portion or of the component;
    c) lowering the building platform layer by layer by a predefined layer thickness; and
    d) repeating the steps a) through c) until completion of the component portion or of the component,
    wherein before, during or after local layer-by-layer fusion or sintering according to process step b), at least one further portion of the component layer is formed by locally fusing or sintering the material by inductive heating at a temperature or in a temperature range above the solidus temperature of the metallic material used.

2. The method as recited in claim 1 wherein the inductive heating is used to fuse or sinter a contour region of the component portion or of the component at least within the at least one material layer.

3. The method as recited in claim 1 wherein during the additive manufacture of the at least one component layer of the component portion or of the component according to process step b), the material, prior to being locally fused or sintered layer by layer by the at least one high-energy beam, is at least partially heated by inductively heating the material to a temperature below the solidus temperature of the material.

4. The method as recited in claim 1 wherein the additive manufacturing method is a selective laser melting or sintering process or an electron beam melting or sintering process or a combination of these processes.

5. The method as recited in claim 1 wherein the formation of the further portion of the component layer by locally fusing or sintering the material by inductive heating occurs in all material layers.

6. The method as recited in claim 1 wherein the formation of the further portion of the component layer by locally fusing or sintering the material by inductive heating does not occur in all material layers.

7. The method as recited in claim 1 wherein the component is a turbomachine component.

8. A device for additive manufacturing of at least a portion of a component, the device comprising:
    a powder feeder for depositing at least one powder layer of a metallic material onto a buildup and joining zone of a building platform;
    at least one radiation source for generating at least one high-energy beam, the at least one powder layer locally fusable or sinterable in the region of the buildup and joining zone by the high energy beam to form at least a portion of a component layer;
    at least one induction device adapted to form a further portion of the component layer by locally fusing or sintering the material of the powder layer by inductive heating at a temperature or in a temperature range above the solidus temperature of the metallic material used; and
    a controller controlling the induction device to inductively heat at the temperature or in the temperature range above the solidus temperature of the metallic material used.

9. The device as recited in claim 8 wherein the induction device has at least one induction coil.

10. The device as recited in claim 9 wherein the at least one induction coil includes two induction coils forming an intersection region.

11. The device as recited in claim 9 wherein the at least one induction device includes at least one further induction coil designed to cause a contour region of the component portion or of the component within the powder layer to be fused or sintered by inductive heating.

12. The device as recited in claim 8 wherein the induction device is controllable such that different temperatures or temperature ranges achievable by inductive heating can be set and controlled before, during or after the additive manufacture of the component portion or of the component.

13. The device as recited in claim 12 wherein at least one temperature or a temperature range is below the solidus temperature of the material during the additive manufacture of the component portion or of the component.

14. The device as recited in claim 8 wherein the further portion of the at least one component layer, the further portion being produced by inductive heating, is a contour region of the component portion or of the component.

15. The device as recited in claim 8 wherein the device includes at least one selective laser melting apparatus or at least one electron beam melting apparatus.

16. The device as recited in claim 8 wherein the device is a turbomachine component manufacturing device.

17. A component for a turbomachine obtained by the method as recited in claim 1.

18. A component for an aircraft engine turbomachine obtained by the method as recited in claim 1.

19. The device as recited in claim 8 wherein the controller is an open- and closed-loop controller controlling power of induction coils of the induction device as well as a position of the induction coils above the building platform.

20. The method as recited in claim 1 wherein before the local layer-by-layer fusion or sintering according to process step b), the at least one further portion of the component layer is formed by locally fusing or sintering the material by the inductive heating at the temperature or in the temperature range above the solidus temperature of the metallic material used.

21. The method as recited in claim 1 wherein during the local layer-by-layer fusion or sintering according to process step b), the at least one further portion of the component layer is formed by locally fusing or sintering the material by the inductive heating at the temperature or in the temperature range above the solidus temperature of the metallic material used.

22. The method as recited in claim 1 wherein after the local layer-by-layer fusion or sintering according to process step b), the at least one further portion of the component layer is formed by locally fusing or sintering the material by the inductive heating at the temperature or in the temperature range above the solidus temperature of the metallic material used.

\* \* \* \* \*